US010750148B2

(12) United States Patent
Hatakenaka et al.

(10) Patent No.: US 10,750,148 B2
(45) Date of Patent: Aug. 18, 2020

(54) UNEVENNESS CORRECTION SYSTEM, UNEVENNESS CORRECTION APPARATUS AND PANEL DRIVE CIRCUIT

(71) Applicant: IIX INC., Tokyo (JP)

(72) Inventors: Makoto Hatakenaka, Tokyo (JP); Takashi Sakamoto, Tokyo (JP); Keisuke Okada, Tokyo (JP)

(73) Assignee: IIX INC., Tokyo (JP)

( * ) Notice: Subject to any disclaimer, the term of this patent is extended or adjusted under 35 U.S.C. 154(b) by 41 days.

(21) Appl. No.: 16/071,461

(22) PCT Filed: Dec. 19, 2016

(86) PCT No.: PCT/JP2016/087738
§ 371 (c)(1),
(2) Date: Jul. 19, 2018

(87) PCT Pub. No.: WO2018/116337
PCT Pub. Date: Jun. 28, 2018

(65) Prior Publication Data
US 2019/0037188 A1    Jan. 31, 2019

(51) Int. Cl.
*H04N 9/69* (2006.01)
*G09G 3/20* (2006.01)
(Continued)

(52) U.S. Cl.
CPC ............. *H04N 9/69* (2013.01); *G09G 3/20* (2013.01); *G09G 3/3233* (2013.01); *G09G 3/36* (2013.01);
(Continued)

(58) Field of Classification Search
CPC .......... H04N 9/69; G09G 3/20; G09G 3/3208; G09G 3/3233; G09G 3/36; G09G 2320/0233
See application file for complete search history.

(56) References Cited

U.S. PATENT DOCUMENTS 7,053,874 B2   5/2006 Koyama
8,339,384 B2  12/2012 Takei et al.
(Continued)

FOREIGN PATENT DOCUMENTS

JP   2001209358 A   8/2001
JP   2010066352 A   3/2010
(Continued)

OTHER PUBLICATIONS

ISA Japan Patent Office, International Search Report Issued in Application No. PCT/JP2016/087738, dated Mar. 14, 2017, WIPO, 3 pages.

*Primary Examiner* — Michael E Teitelbaum
(74) *Attorney, Agent, or Firm* — Alleman Hall Creasman & Tuttle LLP

(57) ABSTRACT

An unevenness correction system according to the present invention includes a panel drive circuit provided with a gamma correction circuit that performs gamma correction on an image signal input to an input interface, a gamma correction information acquisition circuit that acquires a gamma correction signal obtained through gamma correction as gamma correction information, an unevenness correction circuit that performs an unevenness correction on the gamma correction signal based on correction data, and an output interface that externally outputs the gamma correction information, and an unevenness correction apparatus provided with a pattern generator that outputs the image signal of a predetermined image to the input interface, and a control unit that generates correction data based on gamma correction information of each individual display panel input to and read by a gamma correction information reading unit from the output interface regarding the output image signal.

3 Claims, 4 Drawing Sheets

(51) Int. Cl.
*G09G 3/36* (2006.01)
*G09G 3/3233* (2016.01)

(52) U.S. Cl.
CPC ............ *G09G 2320/0233* (2013.01); *G09G 2320/0285* (2013.01); *G09G 2360/147* (2013.01)

(56) References Cited

U.S. PATENT DOCUMENTS

| | | |
|---|---|---|
| 9,142,159 B2 | 9/2015 | Inoue et al. |
| 2002/0075277 A1 | 6/2002 | Naito et al. |
| 2004/0113882 A1* | 6/2004 | Baek .................. G09G 3/3611 345/99 |
| 2007/0052633 A1 | 3/2007 | Sato et al. |
| 2007/0273701 A1 | 11/2007 | Mizukoshi et al. |
| 2008/0278421 A1 | 11/2008 | Inoue et al. |
| 2009/0160742 A1 | 6/2009 | Mizukoshi et al. |
| 2014/0192099 A1 | 7/2014 | Inoue et al. |

FOREIGN PATENT DOCUMENTS

| | | |
|---|---|---|
| JP | 2011209513 A | 10/2011 |
| JP | 2016109840 A | 6/2016 |
| TW | 200907906 A | 2/2009 |
| TW | I415057 B | 11/2013 |
| TW | I467545 B | 1/2015 |

\* cited by examiner

UNEVENNESS CORRECTION SYSTEM, UNEVENNESS CORRECTION APPARATUS AND PANEL DRIVE CIRCUIT

TECHNICAL FIELD

The present invention relates to an unevenness correction apparatus that generates correction data for unevenness correction of a display panel, a panel drive circuit that is incorporated in the display panel and performs an unevenness correction based on the correction data, and an unevenness correction system that is constituted thereby.

BACKGROUND ART

Panel drive circuits (semiconductor integrated circuits) of display panels such as liquid crystal panels and organic EL (electroluminescent) panels, generally include a gamma correction circuit for setting gamma characteristics (gamma values) in accordance with the characteristics of each individual display panel. Also, there are panel drive circuits that include an unevenness correction circuit for correcting luminance unevenness and color unevenness that occur at a hardware level, by superimposing reverse phase data of the unevenness on the original image for each region or each pixel of the display panel.

With a panel drive circuit that is provided with a gamma correction circuit and an unevenness correction circuit, in the case where the unevenness correction circuit is upstream of (processes input from outside before) the gamma correction circuit, the luminance characteristics of the display panel with respect to the output of the unevenness correction circuit are known (generally, parameters are determined such that the gamma correction circuit is adjusted to a predetermined gamma characteristic before implementing an unevenness correction, and individual differences between products are minimized) as the product specification of a panel module that combines the panel drive circuit (particularly the gamma correction circuit) and the display panel, thus enabling the unevenness correction in the unevenness correction circuit to be performed utilizing these luminance characteristics. For example, because a derivative (dL/dV) indicating the change in luminance (dL) to the change in input digital value (dV) is determined, if the luminance characteristics of the panel with respect to input are curve characteristics in which γ (gamma value)=2.2, as the product specification of the panel module, the unevenness correction circuit need only perform the unevenness correction, using correction data calculated based on the derivative.

In the case of wanting to obtain display with a gamma characteristic other than the gamma characteristic (gamma value) set previously, such as in the case of wanting to change the gamma characteristic in order to obtain display that is easy to see outdoors where it is bright, for example, the settings of the gamma correction circuit have to be changed. There is, however, a problem in that it becomes necessary, at this time, to perform the unevenness correction after generating correction data adjusted to the changed gamma characteristic, complicating the algorithm for the unevenness correction.

In contrast, as described in Patent Document 1, in the case where a color unevenness correction execution unit (unevenness correction circuit) is downstream of (processes input from outside after) a gamma correction execution unit (gamma correction circuit), the gamma characteristics of a circuit block downstream of the unevenness correction circuit that are targeted for correction by the unevenness correction circuit do not change, even if the settings of the gamma correction circuit are changed, thus enabling the unevenness correction to be performed using the same algorithm as before the settings of the gamma correction circuit are changed.

CITATION LIST

Patent Document

Patent Document 1: JP 2016-109840A

SUMMARY OF INVENTION

Technical Problem

However, in the case where the unevenness correction circuit is downstream of the gamma correction circuit, the luminance characteristics of the display panel with respect to the output of the unevenness correction circuit are not defined as the product specification of the panel module and will thus differ for each individual display panel, and the unevenness correction adjusted for the characteristics of each individual display panel will need to be performed. If the characteristics of each individual display panel are unknown and correction data is generated without taking these characteristics into consideration, the unevenness correction cannot be performed correctly.

On the other hand, in order to ascertain the characteristics of each individual display panel, it is conceivable to optically measure the characteristics using a luminance meter, a camera, or the like in the unevenness correction process, but because a process of measuring the characteristics of each individual display panel and determining the parameters of a gamma table generally takes place before the unevenness correction process, this technique results in characteristics measurement being performed all over again, and is not preferable due to incurring increases in cost and production time.

The present invention was made in view of the above circumstances, and has an object of providing an unevenness correction system that is able to perform the unevenness correction adjusted for the characteristics of each individual display panel while suppressing increases in cost and production time, in the case of performing unevenness correction downstream of gamma correction, and an unevenness correction apparatus and a panel drive circuit that constitute the system.

Solution to Problem

In order to solve the above object, an unevenness correction system according to the present invention includes a panel drive circuit and an unevenness correction apparatus, the panel drive circuit including: an image signal input unit to which an image signal is input; a gamma correction means configured to perform a gamma correction on the image signal input to the image signal input unit or an image processing signal obtained through image processing performed on the image signal input to the image signal input unit, such that a resultant signal has a predetermined gamma characteristic; a gamma correction information acquisition means configured to read a gamma correction signal obtained through the gamma correction by the gamma correction means, and acquire, as gamma correction information, the gamma correction signal or a result of comparing the gamma correction signal with the image signal input to the image signal input unit; an unevenness correction means configured to perform an unevenness correction on the gamma correction signal, based on correction data for reducing unevenness of a display panel; a D/A conversion means configured to perform a D/A conversion on an unevenness correction signal obtained through the unevenness correction by the unevenness correction means, and output a resultant signal to the display panel; and a gamma correction information output unit configured to externally output the gamma correction information acquired by the gamma correction information acquisition means, and the unevenness correction apparatus including: an image signal output unit connected to the panel drive circuit, and configured to output the image signal of a predetermined image as an original image signal to the image signal input unit; a gamma correction information input unit to which the gamma correction information output by the gamma correction information output unit is input regarding the original image signal; and a correction data generation means configured to generate the correction data based on the gamma correction information input to the gamma correction information input unit.

An unevenness correction apparatus according to the present invention includes an image signal output unit connected to a panel drive circuit including an image signal input unit to which an image signal is input, and configured to output the image signal of a predetermined image as an original image signal to the image signal input unit, the panel drive circuit further including a gamma correction means configured to perform a gamma correction on the image signal input to the image signal input unit or an image processing signal obtained through image processing performed on the image signal input to the image signal input unit, such that a resultant signal has a predetermined gamma characteristic, a gamma correction information acquisition means configured to read a gamma correction signal obtained through the gamma correction by the gamma correction means and acquire, as gamma correction information, the gamma correction signal or a result of comparing the gamma correction signal with the image signal input to the image signal input unit, an unevenness correction means configured to perform an unevenness correction on the gamma correction signal, based on correction data for reducing unevenness of a display panel, a D/A conversion means configured to perform a D/A conversion on an unevenness correction signal obtained through the unevenness correction by the unevenness correction means and output a resultant signal to the display panel, and a gamma correction information output unit configured to externally output the gamma correction information acquired by the gamma correction information acquisition means; a gamma correction information input unit to which the gamma correction information output by the gamma correction information output unit is input regarding the original image signal; and a correction data generation means configured to generate the correction data based on the gamma correction information input to the gamma correction information input unit.

A panel drive circuit according to the present invention includes an image signal input unit to which an image signal is input; a gamma correction means configured to perform a gamma correction on the image signal input to the image signal input unit or an image processing signal obtained through image processing performed on the image signal input to the image signal input unit, such that a resultant signal has a predetermined gamma characteristic; a gamma correction information acquisition means configured to read a gamma correction signal obtained through the gamma correction by the gamma correction means, and acquire, as gamma correction information, the gamma correction signal or a result of comparing the gamma correction signal with the image signal input to the image signal input unit; an unevenness correction means configured to perform an unevenness correction on the gamma correction signal, based on correction data for reducing unevenness of a display panel; and a D/A conversion means configured to perform a D/A conversion on an unevenness correction signal obtained through the unevenness correction by the unevenness correction means, and output a resultant signal to the display panel, and the correction data is generated based on the gamma correction information.

Advantageous Effects of Invention

With an unevenness correction system, an unevenness correction apparatus, or a panel drive circuit according to the present invention, an unevenness correction means performs an unevenness correction on a gamma correction signal obtained through a gamma correction by a gamma correction means, based on correction data for the unevenness correction. The correction data is generated based on the gamma correction signal or gamma correction information obtained through comparing the gamma correction signal with an image signal input to an image signal input unit, and because the gamma correction information includes the characteristics of each individual display panel, and is, moreover, derived simply by digitally reading out the image signal of at least one predetermined image through the gamma correction means, it becomes possible to perform the unevenness correction adjusted for the characteristics of each individual display panel while suppressing increases in cost and production time, in the case of performing unevenness correction downstream of gamma correction.

DESCRIPTION OF EMBODIMENTS

A mode for carrying out the present invention will be described, using the drawings.

Figure 1:
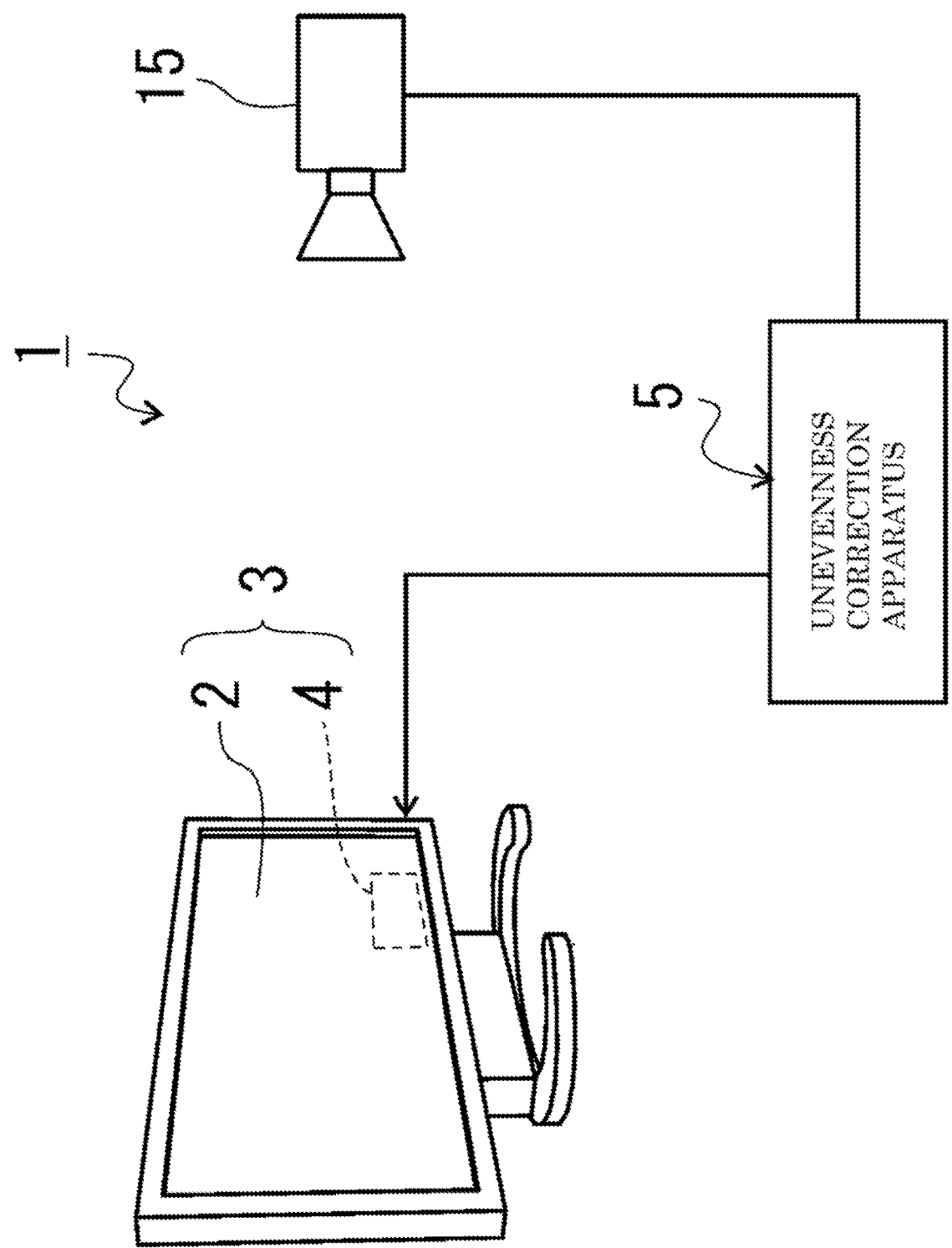
FIG. 1 is an explanatory diagram showing an unevenness correction system according to a mode for carrying out the invention.

FIG. 1 shows an unevenness correction system according to this mode. An unevenness correction system 1, in order to correct image signals that are input to a display panel 2 consisting of a liquid crystal panel based on correction data and reduce unevenness of the display panel 2, generates the correction data, and is thus provided with a panel drive circuit 4 that is incorporated in the display panel 2 to constitute a panel module 3 and with an unevenness correction apparatus 5.

Figure 2:
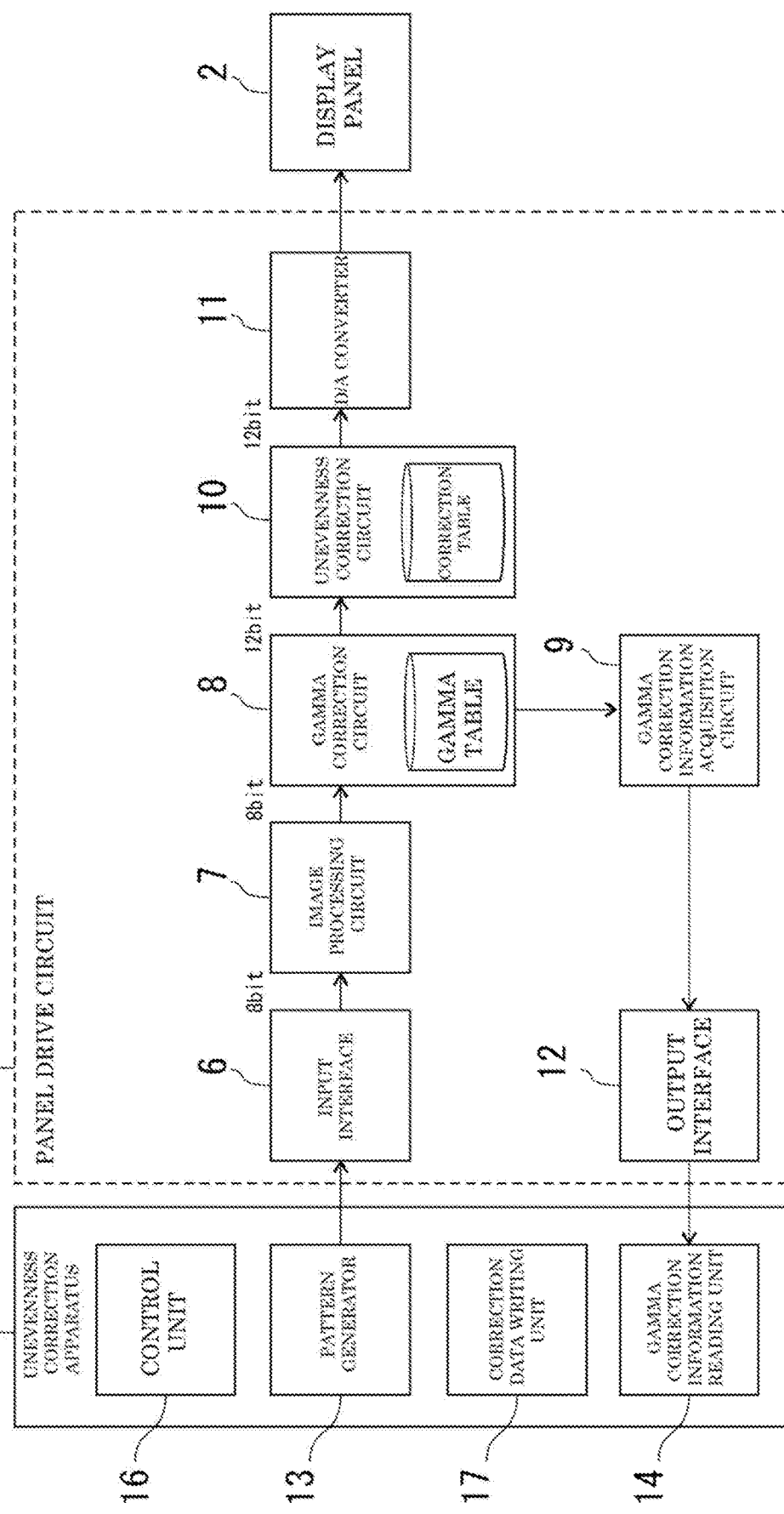
FIG. 2 is an explanatory diagram showing a detailed configuration of a panel drive circuit and an unevenness correction apparatus that constitute the unevenness correction system of FIG. 1.

As shown in FIG. 2, the panel drive circuit 4 is provided with an input interface 6 to which a digital image signal is input, an image processing circuit 7 that performs image processing on the image signal input to the input interface 6, a gamma correction circuit 8 that performs gamma correction on an image processing signal obtained through the image processing by the image processing circuit 7, such that the resultant signal has a predetermined gamma characteristic, with reference to a gamma table set in accordance with the individual characteristics of the display panel 2 in which the panel drive circuit 4 is incorporated, a gamma correction information acquisition circuit 9 that reads a gamma correction signal obtained through the gamma correction by the gamma correction circuit 8, and acquires this signal as gamma correction information, an unevenness correction circuit 10 that performs an unevenness correction on the gamma correction signal, with reference to a correction table in which correction data for reducing unevenness of the display panel 2 is recorded, a D/A (digital to analog) converter 11 that performs a D/A conversion on an unevenness correction signal obtained through the unevenness correction by the unevenness correction circuit 10, and outputs the resultant signal to the display panel 2, and an output interface 12 that externally outputs the gamma correction information acquired by the gamma correction information acquisition circuit 9.

The unevenness correction apparatus 5 is provided with a pattern generator 13 that outputs the digital image signal to the input interface 6, in a state of being connected to the panel drive circuit 4, a gamma correction information reading unit 14 to which the gamma correction information output by the output interface 12 is input, a control unit 16 that integrally controls the pattern generator 13, the gamma correction information reading unit 14 and an individual image sensor camera 15 (refer to FIG. 1) for performing image capture on the display panel 2, and generates correction data, and a correction data writing unit 17 that writes the correction data generated under the control of the control unit 16 to the correction table of the unevenness correction circuit 10.

Figure 3:
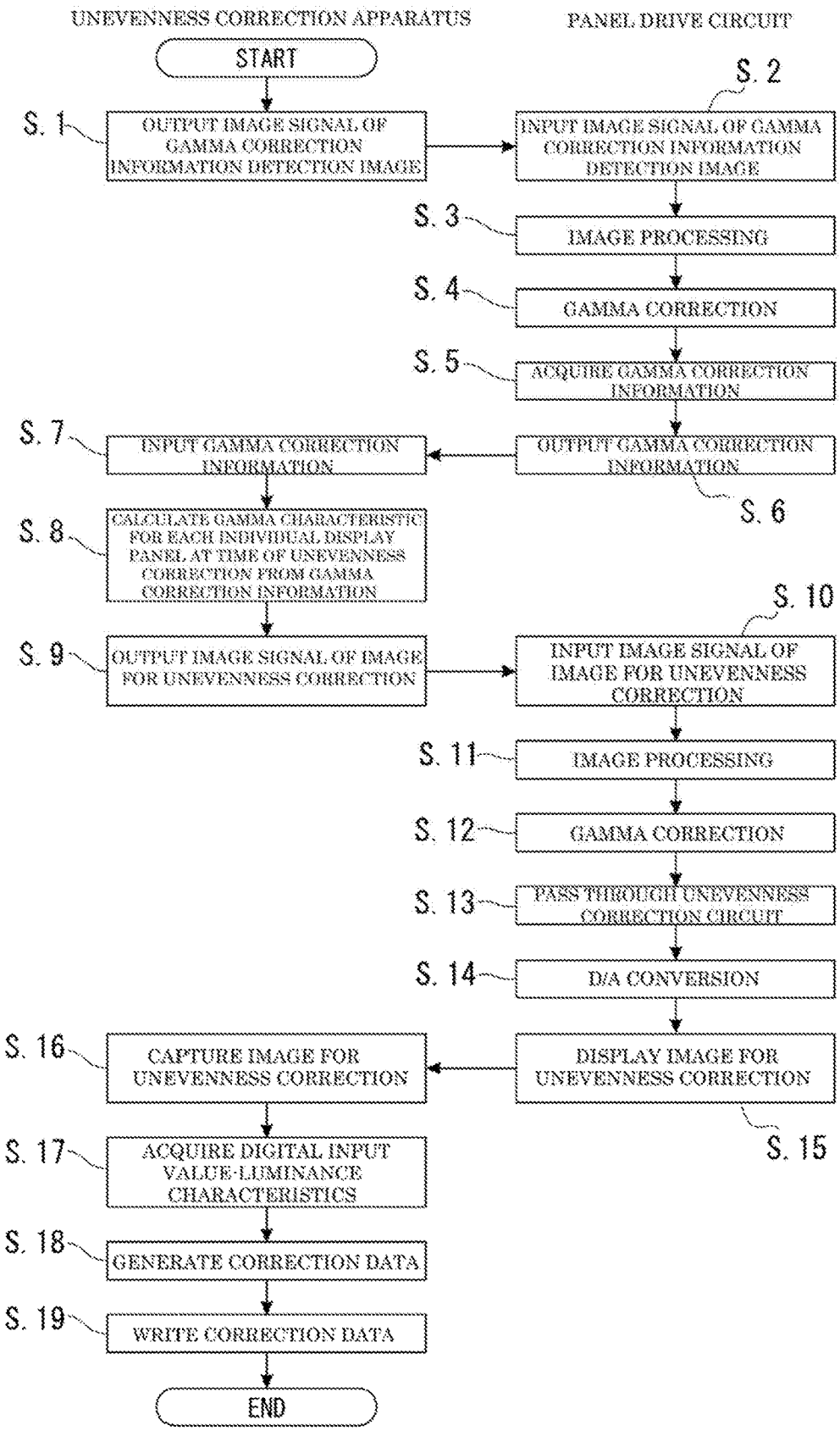
FIG. 3 is a flowchart showing operations of the unevenness correction system of FIG. 1 in chronological order.

At the time of generating correction data, the control unit 16 of the unevenness correction apparatus 5, as shown in FIG. 3, outputs an 8-bit digital image signal of a predetermined image for detecting gamma correction information in the panel drive circuit 4 (hereinafter, "gamma correction information detection image") to the input interface 6 (step 1 ("S.1" in FIG. 3; this similarly applies hereinafter), using the pattern generator 13.

The image signal input to the input interface 6 undergoes image processing such as color management and edge enhancement by the image processing circuit 7 (steps 2 and 3) and is input to the gamma correction circuit 8 as an 8-bit image processing signal. In the gamma correction circuit 8, gamma correction is performed on the input image processing signal, with reference to the gamma table (step 4), and a 12-bit gamma correction signal generated thereby is output to the gamma correction information acquisition circuit 9.

The gamma correction signal input to the gamma correction information acquisition circuit 9 is read by the gamma correction information acquisition circuit 9 and acquired as gamma correction information (step 5), and is output to the output interface 12.

Figure 4:
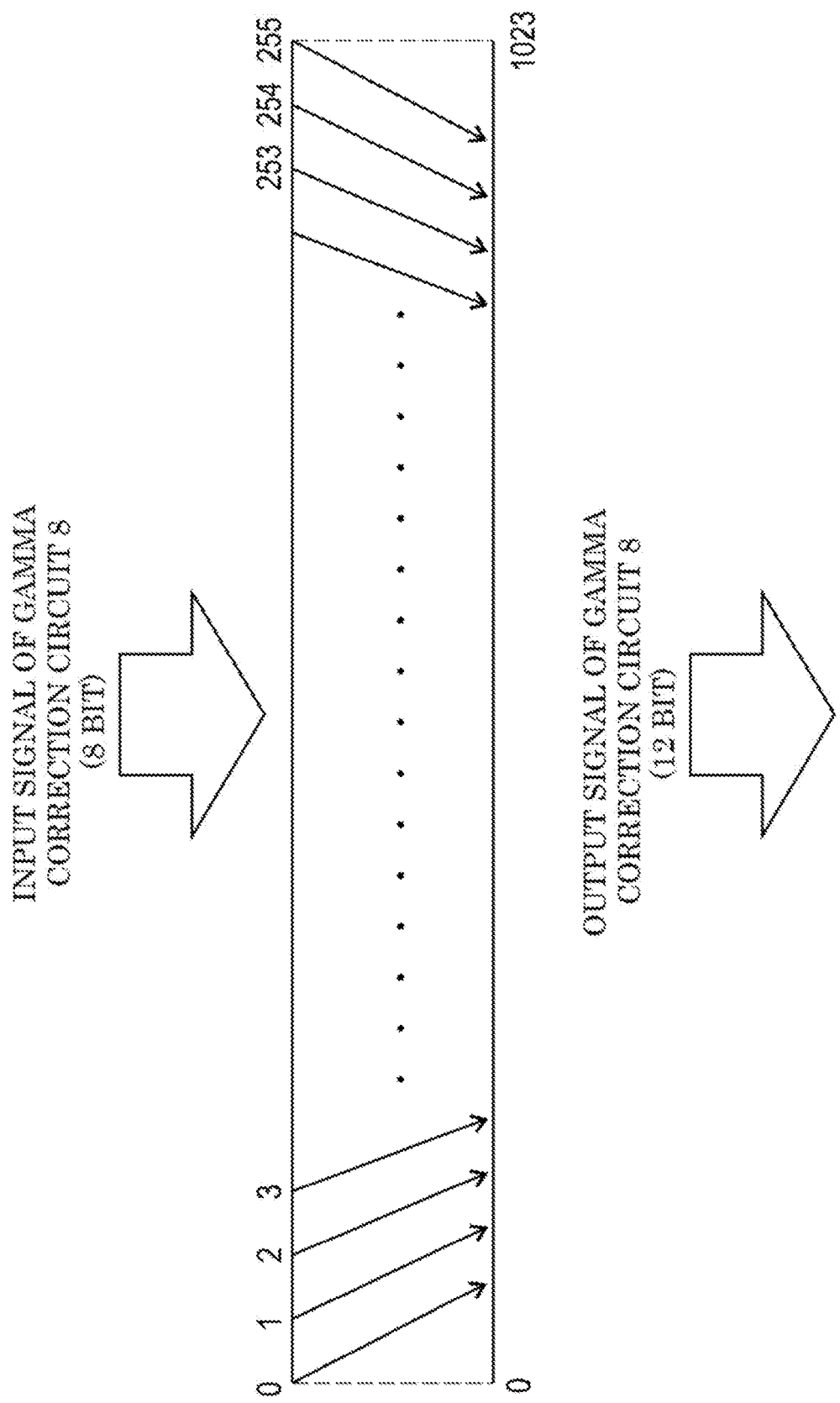
FIG. 4 is an explanatory diagram showing scale conversion of input-output signals in a gamma correction circuit of the unevenness correction system of FIG. 1.

The gamma correction information input to the output interface 12 is output to the unevenness correction apparatus 5 (step 6), and is input to and read by the gamma correction information reading unit 14 (step 7). The control unit 16 detects the gamma characteristic set in the gamma table of the gamma correction circuit 8 in accordance with the individual characteristics of the display panel 2 (specifically, as shown in FIG. 4, the 8-bit input signal of the gamma correction circuit 8 is scale converted through gamma correction to a 12-bit output signal, with the scale conversion information, here, corresponding to the "gamma characteristic"), through comparing the read gamma correction information with the image signals of gamma correction information detection images (step 8).

Next, the control unit 16 outputs an 8-bit digital image signal of an image for unevenness correction (e.g., raster image) to the input interface 6, using the pattern generator 13 (step 9).

The image signal input to the input interface 6 undergoes image processing in the image processing circuit 7 (steps 10 and 11) and is input to the gamma correction circuit 8 as an image processing signal. In the gamma correction circuit 8, gamma correction is performed on the input image processing signal with reference to the gamma table (step 12) and is output to the unevenness correction circuit 10. In the unevenness correction circuit 10, the unevenness correction is performed on the input gamma correction signal with reference to a correction table, and a 12-bit unevenness correction signal generated thereby is output to the D/A converter 11, although, at this point in time, the unevenness correction is not actually performed since correction data has yet to be input to the correction table, and thus the unevenness correction signal coincides with the gamma correction signal (step 13).

In the D/A converter 11, the D/A conversion is performed on the input unevenness correction signal (step 14), an analog image signal generated thereby is output to the display panel 2, and a gamma correction information detection image is displayed on the display panel 2 (step 15).

Next, the control unit 16 captures the image for the unevenness correction displayed on the display panel 2 using the camera 15 (step 16), derives the luminance for each pixel of the display panel 2, based on the captured image of the camera 15 using a method described in JP 2016-004037A, for example (step 17), and generates correction data, based on these luminance values and the gamma value detected above (step 18). Correction data is desirably derived for each of predetermined gradations, by displaying and capturing the image for the unevenness correction a plurality of times while changing the gradation.

The control unit 16 then writes the generated correction data to the correction table of the unevenness correction circuit 10 using the correction data writing unit 17 (step 19), thereby enabling the panel drive circuit 4 to perform the unevenness correction on the input image signal based on the correction data.

In the unevenness correction system according to this mode, the unevenness correction circuit 10 performs the unevenness correction on the gamma correction signal obtained through gamma correction by the gamma correction circuit 8, based on the correction data for the unevenness correction. The correction data is generated based on gamma correction information which is the gamma correction signal, and because the gamma correction information includes the characteristics of each individual display panel 2 and is, moreover, derived simply by digitally reading out the image signal of at least one gamma correction information detection image through the gamma correction means, the unevenness correction adjusted for the characteristics of each individual display panel 2 can be performed while suppressing increases in cost and production time, in the case of performing the unevenness correction downstream of gamma correction.

Also, in the gamma correction circuit 8, an 8-bit input signal is output as a 12-bit signal in order to ensure accuracy after conversion by gamma correction, and the highest luminance that can be represented by the maximum value with 8 bits can thereby be represented by intermediate values with 12 bits, enabling unevenness correction to be performed on the highest luminance in a direction that raises the luminance further.

Although a mode for carrying out the present invention was illustrated above, embodiments of the present invention are not limited to the foregoing mode, and modifications and the like may be made as appropriate without departing from the spirit of the invention.

For example, in the above mode, the display panel 2 was given as a liquid crystal panel, but may be an organic EL panel or the like, and comparison of the image signal, input to the input interface 6, of a gamma correction information detection image and the gamma correction signal was performed by the unevenness correction apparatus 5, but may be performed by the panel drive circuit 4.

Furthermore, the output of the gamma correction circuit need not be 12 bits and can be any suitable information amount such as 10 bits, 11 bits, or 14 bits.

LIST OF REFERENCE CHARACTERS

1 Unevenness correction system
2 Display panel
4 Panel drive circuit
5 Unevenness correction apparatus
6 Input interface (image signal input unit)
8 Gamma correction circuit (gamma correction means)
9 Gamma correction information acquisition circuit (gamma correction information acquisition means)
10 Unevenness correction circuit (unevenness correction means)
11 D/A converter (D/A conversion means)
12 Output interface (gamma correction information output unit)
13 Pattern generator (image signal output unit)
14 Gamma correction information reading unit (gamma correction information input unit)
16 Control unit (correction data generation means)

The invention claimed is:

1. An unevenness correction system comprising a panel drive circuit and an unevenness correction apparatus,
the panel drive circuit including:
an image signal input unit to which an image signal is input;
a gamma correction circuit configured to perform a gamma correction on the image signal which was input to the image signal input unit or an image processing signal obtained through image processing performed on the image signal which was input to the image signal input unit, so as to generate a gamma correction signal with a predetermined gamma characteristic;
a gamma correction information acquisition circuit configured to read the gamma correction signal generated through the gamma correction by the gamma correction circuit, and acquire, as the gamma correction information, the gamma correction signal or a result of comparing the gamma correction signal with the image signal which was input to the image signal input unit;
an unevenness correction circuit configured to perform an unevenness correction on the gamma correction signal, based on correction data for reducing unevenness of a display panel, so as to generate an unevenness correction signal;
a D/A converter configured to perform a D/A conversion on the unevenness correction signal generated through the unevenness correction by the unevenness correction circuit, and output a resultant signal to the display panel; and
a gamma correction information output unit configured to externally output the gamma correction information acquired by the gamma correction information acquisition circuit, and
the unevenness correction apparatus including:
an image signal output unit connected to the panel drive circuit, and configured to output the image signal of a predetermined image as an original image signal to the image signal input unit;
a gamma correction information input unit to which the gamma correction information output by the gamma correction information output unit is input regarding the original image signal; and
a control circuit configured to generate the correction data based at least on the gamma correction information input to the gamma correction information input unit,
wherein after the image signal output unit outputs the image signal of a gamma correction information detection image, for detecting the gamma correction information, to the image signal input unit and the gamma correction information output unit outputs the gamma correction information acquired by the gamma correction information acquisition circuit to the gamma correction information input unit, the image signal output unit outputs the image signal of an image for unevenness correction to the image signal input unit, the gamma correction circuit performs the gamma correction on the image signal of the image for unevenness correction or the image processing signal obtained by performing image processing on the image signal of the image for unevenness correction so as to generate the gamma correction signal, the D/A converter performs the D/A conversion on the gamma correction signal generated through the gamma correction by the gamma correction circuit as the unevenness correction signal so as to generate the resultant signal that is output to the display panel, and the control circuit generates the correction data based on a captured image of the image for unevenness correction displayed on the display panel and the gamma correction information acquired by the gamma correction information acquisition circuit.

2. An unevenness correction apparatus comprising:
an image signal output unit connected to a panel drive circuit including an image signal input unit to which an image signal is input, and configured to output the image signal of a predetermined image as an original image signal to the image signal input unit, the panel drive circuit further including:
a gamma correction circuit configured to perform a gamma correction on the image signal which was input to the image signal input unit or an image processing signal obtained through image processing performed on the image signal which was input to the image signal input unit, so as to generate a gamma correction signal with a predetermined gamma characteristic;

a gamma correction information acquisition circuit configured to read the gamma correction signal generated through the gamma correction by the gamma correction circuit and acquire, as the gamma correction information, the gamma correction signal or a result of comparing the gamma correction signal with the image signal which was input to the image signal input unit;

an unevenness correction circuit configured to perform an unevenness correction on the gamma correction signal, based on correction data for reducing unevenness of a display panel, so as to generate an unevenness correction signal;

a D/A converter configured to perform a D/A conversion on the unevenness correction signal generated through the unevenness correction by the unevenness correction circuit, and output a resultant signal to the display panel; and a gamma correction information output unit configured to externally output the gamma correction information acquired by the gamma correction information acquisition circuit;

a gamma correction information input unit to which the gamma correction information output by the gamma correction information output unit is input regarding the original image signal; and a control circuit configured to generate the correction data based on at least on the gamma correction information input to the gamma correction information input unit, wherein after the image signal output unit outputs the image signal of a gamma correction information detection image, for detecting the gamma correction information, to the image signal input unit and the gamma correction information output unit outputs the gamma correction information acquired by the gamma correction information acquisition circuit to the gamma correction information input unit, the image signal output unit outputs the image signal of an image for unevenness correction to the image signal input unit, the gamma correction circuit performs the gamma correction on the image signal of the image for unevenness correction or the image processing signal obtained by performing image processing on the image signal of the image for unevenness correction so as to generate the gamma correction signal, the D/A converter performs the D/A conversion on the gamma correction signal generated through the gamma correction by the gamma correction circuit as the unevenness correction signal so as to generate the resultant signal that is output to the display panel, and the control circuit generates the correction data based on a captured image of the image for unevenness correction displayed on the display panel and the gamma correction information acquired by the gamma correction information acquisition circuit.

3. A panel drive circuit comprising:

an image signal input unit to which an image signal is input;

a gamma correction circuit configured to perform a gamma correction on the image signal which was input to the image signal input unit or an image processing signal obtained through image processing performed on the image signal which was input to the image signal input unit, so as to generate a gamma correction signal with a predetermined gamma characteristic;

a gamma correction information acquisition circuit configured to read the gamma correction signal generated through the gamma correction by the gamma correction circuit, and acquire, as the gamma correction information, the gamma correction signal or a result of comparing the gamma correction signal with the image signal which was input to the image signal input unit;

an unevenness correction circuit configured to perform an unevenness correction on the gamma correction signal, based on correction data for reducing unevenness of a display panel, so as to generate an unevenness correction signal;

a D/A converter configured to perform a D/A conversion on the unevenness correction signal generated through the unevenness correction by the unevenness correction circuit, and output a resultant signal to the display panel; and a gamma correction information output unit configured to externally output the gamma correction information acquired by the gamma correction information acquisition circuit, wherein after an unevenness correction apparatus outputs the image signal of a gamma correction information detection image, for detecting the gamma correction information, to the image signal input unit and the gamma correction information output unit outputs the gamma correction information acquired by the gamma correction information acquisition circuit to the unevenness correction apparatus, the unevenness correction apparatus outputs the image signal of an image for unevenness correction to the image signal input unit, the gamma correction circuit performs the gamma correction on the image signal of the image for unevenness correction or the image processing signal obtained by performing image processing on the image signal of the image for unevenness correction so as to generate the gamma correction signal, the D/A converter performs the D/A conversion on the gamma correction signal generated through the gamma correction by the gamma correction circuit as the unevenness correction signal so as to generate the resultant signal that is output to the display panel, and the unevenness correction apparatus generates the correction data based on a captured image of the image for unevenness correction displayed on the display panel and the gamma correction information acquired by the gamma correction information acquisition circuit.

* * * * *